(12) United States Patent
Skillsäter et al.

(10) Patent No.: US 11,782,412 B2
(45) Date of Patent: Oct. 10, 2023

(54) METHOD FOR CONTROLLING A MATERIAL, PROCESSING DEVICE AND A LOAD-CARRYING VEHICLE

(71) Applicant: Volvo Construction Equipment AB, Eskilstuna (SE)

(72) Inventors: Calle Skillsäter, Torshälla (SE); Andreas Norrman, Arboga (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 124 days.

(21) Appl. No.: 17/436,122

(22) PCT Filed: Mar. 4, 2019

(86) PCT No.: PCT/EP2019/055282
§ 371 (c)(1),
(2) Date: Sep. 3, 2021

(87) PCT Pub. No.: WO2020/177851
PCT Pub. Date: Sep. 10, 2020

(65) Prior Publication Data
US 2022/0147012 A1 May 12, 2022

(51) Int. Cl.
*G05B 19/19* (2006.01)
*G05D 1/02* (2020.01)

(52) U.S. Cl.
CPC .......... *G05B 19/19* (2013.01); *G05D 1/0291* (2013.01); *G05B 2219/40068* (2013.01); *G05D 2201/0202* (2013.01)

(58) Field of Classification Search
CPC .......... G05B 19/19; G05B 2219/40068; G05D 1/0291; G05D 2201/0202
See application file for complete search history.

(56) References Cited

U.S. PATENT DOCUMENTS 5,906,646 A 5/1999 Kemner
6,484,078 B1 * 11/2002 Kageyama ............... G08G 1/20
701/25

(Continued)

FOREIGN PATENT DOCUMENTS

| CA | 2844475 A1 * | 9/2014 | ............ G01C 21/00 |
| WO | 2015065251 A1 | 5/2015 | |
| WO | WO-2020177851 A1 * | 9/2020 | ............ G05B 19/19 |

OTHER PUBLICATIONS

International Search Report and Written Opinion of the International Searching Authority, PCT/EP2019/055282, dated May 22, 2019, 12 pages.

(Continued)

*Primary Examiner* — Ronald D Hartman, Jr.
(74) *Attorney, Agent, or Firm* — Sage Patent Group

(57) ABSTRACT

A method including determining a total amount of unprocessed material that has been dumped into the material processing device during a first time period determining a total amount of unprocessed material that has been processed during the first time period; determining a reference level of unprocessed material at the first point in time; predicting, based on the current level of unprocessed material contained in the material processing device and on an expected future processing rate of the material processing device at least one of an earlier and a later point in time at which the level of unprocessed material is expected to fall below a lower or upper limit; establishing a desired time-of-arrival period extending between a start point and an end point corresponding to the earlier and later points in time respectively; and adapting a speed of the first load-carrying vehicle.

24 Claims, 3 Drawing Sheets

(56) References Cited

U.S. PATENT DOCUMENTS

| | | | |
|---|---|---|---|
| 6,529,812 B1* | 3/2003 | Koehrsen | E02F 9/26 |
| | | | 700/83 |
| 9,441,971 B2 | 9/2016 | Casson et al. | |
| 2001/0044697 A1* | 11/2001 | Kageyama | G08G 1/207 |
| | | | 701/482 |
| 2003/0069680 A1 | 4/2003 | Cohen et al. | |
| 2011/0089270 A1 | 4/2011 | Juha et al. | |
| 2014/0297182 A1* | 10/2014 | Casson | G01C 21/28 |
| | | | 701/537 |
| 2017/0060126 A1 | 3/2017 | Marsolek et al. | |
| 2017/0072826 A1* | 3/2017 | Humphrey | B60P 1/283 |
| 2021/0388577 A1* | 12/2021 | Eklund | G05D 1/0217 |

OTHER PUBLICATIONS

International Preliminary Report on Patentability issued by the International Preliminary Examining Authority, dated Jun. 10, 2021, 10 pages.

* cited by examiner

METHOD FOR CONTROLLING A MATERIAL, PROCESSING DEVICE AND A LOAD-CARRYING VEHICLE

CROSS REFERENCE TO RELATED APPLICATIONS

This application is a 35 U.S.C. § 371 national stage application of PCT International Application No. PCT/EP2019/055282 filed on Mar. 4, 2019, the disclosure and content of which is incorporated by reference herein in its entirety.

TECHNICAL FIELD

The invention relates to a method for controlling a system comprising a material processing device and at least one load-carrying vehicle configured to transport a load of unprocessed material to the material processing device and dump the unprocessed material directly or indirectly into the material processing device The invention can in particular be applied to a construction site where load-carrying vehicles, such as haulers and dump trucks, transport e.g. rock fragments to a material processing device in the form of a crusher.

BACKGROUND

Working machine vehicles in the form of articulated haulers, wheel loaders, trucks and dumpers are frequently used for loading and transporting of material loads at construction sites and the like. A load-receiving container of a hauler or dump truck may for instance be loaded with unprocessed material, such as rock fragments, at a loading location, transport the material to a another location and dump the material (in)to a material processing device, such as into a buffering feeder of a crusher arranged to crush the rock fragments into smaller fragments.

Efficient production and utilization of equipment requires that material processing devices do not run out of unprocessed material and that vehicles do not have to line up and wait at loading or unloading. WO2015/065251 addresses this issue and proposes calculating an estimated time of arrival for vehicles at some target destination, transmitting between the vehicles information about estimated times of arrivals for various vehicles, and adapting the speed of the vehicles to avoid waiting time or that a crusher goes empty and to save energy/fuel (when decreasing the speed).

Although the method disclosed in WO2015/065251 seems useful and may solve some of the issues related to control of construction site vehicles and equipment there is still a need for improvements.

SUMMARY

An object of the invention is to provide a method and system for controlling a material processing device and a load-carrying vehicle configured to transport and dump a load of unprocessed material to the processing device, which method/system has the potential of further increasing production efficiency and utilization of equipment.

According to a first aspect of the invention, the object is achieved by a method according to claim 1. According to a second aspect of the invention, the object is achieved by a system according to another independent claim. According to further aspects of the invention, the object is solved by computer-related items according to further independent claims.

The first aspect of the invention concerns a method for controlling a system comprising a material processing device and at least one load-carrying vehicle configured to transport a load of unprocessed material to the material processing device and dump the unprocessed material directly or indirectly into the material processing device.

The method is characterized by the steps of:
  determining a total amount of unprocessed material that has been dumped into the material processing device during a first time period between a first point in time and a second point in time;
  determining a total amount of unprocessed material that has been processed by the material processing device during the first time period;
  determining a reference level of unprocessed material contained in the material processing device at the first point in time;
  determining a current level of unprocessed material contained in the material processing device based on i) the total amount of unprocessed material that has been dumped into the material processing device during the first time period, ii) the total amount of unprocessed material that has been processed by the material processing device during the first time period, and iii) the reference level of unprocessed material contained in the material processing device at the first point in time;
  predicting, based on the current level of unprocessed material contained in the material processing device and on an expected future processing rate of the material processing device, at least one of:
    a third point in time at which the level of unprocessed material is expected to fall below an upper limit at which upper limit dumping of further unprocessed material into the material processing device is not allowed so that dumping of unprocessed material becomes allowed,
    and
    a fourth point in time at which the level of unprocessed material is expected to fall below a lower limit indicating that the material processing device has or is about to run out of unprocessed material;
  establishing a desired time-of-arrival period for arrival of a first load-carrying vehicle at the material processing device, wherein the desired time-of-arrival period extends between a start point and an end point and wherein at least one of the start point and end point is set so that the start point is, at the earliest, at the third point in time and/or so that the end point is, at the latest, at the fourth point in time; and
  adapting a speed of the first load-carrying vehicle so as to arrive at the material processing device within the desired time-of-arrival period.

In short the method calculates a current material level in the processing device based on a dump rate, a processing rate and a reference level value, then predicts a start point and/or an end point for a desired time-of-arrival period based on the current material level and an expected future processing rate of the material processing device, and then adapts the speed of the vehicle so that it arrives at the processing device within the desired period before the device runs out of material (e.g. before a crusher feeder gets empty) and/or after the device has been too full so that the vehicle can avoid waiting before being allowed to dump.

The method gives a span for the vehicle speed to be used so as to select a suitable speed that saves fuel/energy. By setting only an end point for the desired time-of-arrival period it can be avoided that the processing device runs out of material to be processed. By setting only a start point for the desired time-of-arrival period that takes into account that the crusher may be full the method reduces or eliminates the risk of driving the vehicle with an unnecessary high speed that would lead to a waiting time at the processing device before the vehicle is allowed to dump its load. Although it may be sufficient to explicitly set only one of the start and end points it is in many situations useful to set both a start point (which may be a current point in time if the processing device is not full) and an end point of the desired time-of-arrival period.

Irrespective of the exact details for carrying out the method, the method is useful for adapting the speed of the first load-carrying vehicle to avoid that the processing device runs out of material, which lowers the general production/processing rate, and/or to avoid that the vehicle must wait at the processing device, in which case it is better to run the vehicle at a lower speed to reduce fuel consumption and arrive at the processing device somewhat later so that dumping of the unprocessed material can be carried out immediately after arrival.

The second point in time may be set to the current point in time so that the level of material determined at the second point in time becomes the current level of unprocessed material contained in the material processing device.

The total amount of unprocessed material that has been dumped into the material processing device during the first time period can in short be obtained by letting each vehicle transmit to all other vehicles or to some central control system information on the weight of its load it has dumped or is about to dump at the processing machine. Summing up all loads over the first time period gives a total weight. An average dump rate (tonnes/h) may also be obtained.

The total amount of unprocessed material that has been processed by the material processing device during the first time period can in short be obtained from some pre-set standard or average processing rate of the processing device and/or from measurements, for instance by a scale arranged to weigh the processed material and transmit that information.

The reference level of unprocessed material contained in the material processing device at the first point in time can, for instance, be an empty (feeder of a) processing device, i.e. the level is zero, or when the level is at or above an upper limit at which dumping of further unprocessed material into the processing device is not allowed, i.e. the level is 100% or >100% of nominal level. Such reference levels can be determined manually or by using a rough level sensor.

Predicting the third and fourth point in time at which the level of unprocessed material is expected to fall below the upper or lower limit involves expected dumping and processing rates and may include e.g. dumping of unprocessed material by a second load-carrying vehicle that is ahead of the first load-carrying vehicle and a given pre-set average processing rate of the material processing device.

Establishing the desired time-of-arrival period for arrival of the first load-carrying vehicle at the material processing device means to set a period between a start point and an end point (i.e. between an earliest desired point in time of arrival and a latest desired point in time of arrival) during which it is desired to let the first vehicle arrive at the processing device and dump its load. By setting the end point at (or maybe somewhat before) the predicted fourth point in time at which the level of unprocessed material in the material processing device is expected to fall below the lower limit, it is ensured that the processing device will not go empty. The start point of the desired time-of-arrival period may as default be set to the current point in time or some arbitrary point before the end point unless the processing device is full or might be full because one or more other vehicles will dump their loads before the first vehicle.

Adapting the speed of the first vehicle so as to arrive at the processing device within the desired time-of-arrival period can be done by calculating a speed interval that is based on the distance between the vehicle and the processing device and that corresponds to the start and end points of the desired time-of-period, and then selecting a suitable speed from the calculated interval. It may also be done the other way by starting out with a generally suitable speed and check whether that speed will take the vehicle to the processing device within the desired period and, if not, select another (reasonable) higher or lower speed. In any case, the selected speed can be displayed so as to indicate to a driver of the vehicle the recommended speed or the vehicle speed can be directly set by a control unit capable of controlling operation of the vehicle.

The method may be used in situations where the material processing device lacks any level sensor. The method may also be used as a back-up when the processing device is provided with a level sensor that is capable of communicating sensor data since it may be difficult to connect to the sensor and since the connection may be lost. The method may also be used where the processing device is provided with only a "simple" level sensor capable of determining only whether the level is above or below the above mentioned upper limit, i.e. a "full" device where vehicles ready to load must weight.

The expression "receiving a signal" sometimes used in this disclosure means generally that some sort of signal is received by some sort of appropriate receiving apparatus. Typically, this means that an electromagnetic signal is automatically sent by wireless means from e.g. a vehicle, a processing device or a central control system and that the signal is received by a receiver that is configured to receive that type of signal and that is arranged in connection with e.g. a control unit of a vehicle or the central control system, where the control unit/system is configured to (by means of processor, memory, etc.) handle the information contained in the signal and to carry out various calculations and determination steps. However, "receiving a signal" may also refer to, for instance, receiving a signal sent from a keyboard or similar via a wire to the control unit/system. An example of a signal that may be received in the latter way is a signal indicative of some form of pre-set value(s) that do(es) not need to be updated very often, such as an average processing rate of the material processing device (which can be used to estimate a total amount of unprocessed material that has been or will be processed by the processing device during a certain time period).

In a preferred variant of the invention, each load-carrying vehicle involved is provided with a transmitter and a receiver for sending and receiving signals by wireless communication (direct radio, vehicle-to-vehicle communication) and a control unit connected to the transmitter and receiver and to e.g. a GPS positioning unit etc. where the control unit comprises memory, processor etc. for storing and handling data, for instance data received by the receiver and data to be sent by the transmitter. The same control unit (or possibly another control unit connected to the first one) is also configured to control the operation of the vehicle, such as speed and dumping. All this is well known as such. Each vehicle is also in possession of information of the weight of the load of unprocessed material that has or will be dumped into the material processing device. Each vehicle is thus configured to be capable of sending to all other vehicles information on the amount of unprocessed material that has or will be dumped into the processing device. Thus, each vehicle is also configured to receive such signals.

In an embodiment the method comprises the step of: determining whether the current level of unprocessed material in the material processing device is above the upper limit at which dumping of further unprocessed material into the material processing device is not allowed.

If the first load-carrying vehicle would arrive before the predicted high-level third point in time it would have to wait at the processing device until the level has fallen below the upper limit. It is thus better to drive with a slower speed and avoid waiting. If it instead is determined that the current level is below the upper limit the start point of the desired period can be set to the current point in time, or to another arbitrary point in time, or not set at all. In practice this would mean that the first load-carrying vehicle can be driven with any suitable speed as long as it arrives before the end point of the desired time-of-arrival period.

In an embodiment the method comprises: determining whether at least a second load-carrying vehicle will arrive at the material processing device before the first load-carrying vehicle; and when so, predicting an amount of unprocessed material to be dumped to the material processing device by the second load-carrying vehicle; wherein the step of predicting the third and/or fourth point in time at which the level of unprocessed material is expected to fall below the lower or upper limit is based also on the predicted amount of unprocessed material to be dumped by the second load-carrying vehicle.

If one or more other vehicles (i.e. at least the second vehicle) is/are ahead of the first vehicle and will dump material to the processing device before the first vehicle it will take a longer time until the processing device runs out of material and the first vehicle can thus slow down to save energy/fuel. It may also be that the load dumped by the second vehicle can be expected to increase the level to above the upper limit so that the first vehicle should decrease its speed to avoid waiting time at the processing device.

In an embodiment the method comprises the steps of: providing information on a current geographical position of the first load-carrying vehicle; determining a distance between the first load-carrying vehicle and the material processing device based on the current geographical position of the first load-carrying vehicle and on information on available routes and a geographical position of the material processing device; determining, based on the distance between the first load-carrying vehicle and the material processing device and on the end point of the desired time-of-arrival period, a minimum average speed adapted so that the first load-carrying vehicle will arrive at the material processing device at the end point of the desired time-of-arrival period if it moves with the minimum average speed; and/or determining, based on the distance between the first load-carrying vehicle and the material processing device and on the start point of the desired time-of-arrival period, a maximum average speed adapted so that the first load-carrying vehicle will arrive at the material processing device at the start point of the desired time-of-arrival period if it moves with the maximum average speed.

A speed higher than the minimum average speed will thus take the vehicle to the processing device before the end point of the desired period and a speed lower than the maximum average speed will lead to an arrival after the start point of the desired period. It may be on certain occasions that it is not possible for practical reasons to reach up to the minimum speed. If so the processing device might run out of material from some time. To calculate the maximum average speed makes most sense when the start point of the desired period is within a reasonable time interval so that the maximum average speed gets reasonable. For instance, if the current level of unprocessed material is below the upper limit and the start point is set to a current point in time the maximum average speed would be infinite, which is not reasonable. So, if the start point of the desired period is not within a reasonable time interval there is no particular point in calculating a maximum average speed. The maximum average speed can then instead be set by practical requirements (maximum desired power, safety, etc.).

In an embodiment the start point of the desired time-of-arrival period is set to be somewhere between a current point in time and a future point in time that is before the end point of the desired time-of-arrival period.

In an embodiment the total amount of unprocessed material dumped into the material processing device during the first time period is at least partly obtained by receiving information on weights of all loads dumped into the material processing device during the first time period or, when the loads have substantially the same weight, by receiving information on a number of dumped loads during the first time period.

In an embodiment the total amount of unprocessed material processed by the material processing device during the first time period is obtained from information of a standard or average processing rate of the material processing device and/or by receiving information from a weighing measurement of a total amount of processed material.

Material that has been processed/crushed by e.g. a crusher device can be weighed by a scale arranged at (below) a conveyor belt at the outlet of the crusher device, or the amount of processed material may be calculated from a set standard processing rate (tonnes/hour) times the total time of production/processing during the first time period.

A standard or average processing rate of the material processing device can be used both for past processing and predicted future processing.

In an embodiment the reference level of unprocessed material contained in the material processing device at the first point in time is a lower limit indicating that the material processing device has or is about to run out of unprocessed material. That is, the material processing device is substantially empty at the first point in time.

In an embodiment the reference level of unprocessed material contained in the material processing device at the first point in time is at or above an upper limit at which dumping of further unprocessed material into the material processing device is not allowed.

In an embodiment the reference level of unprocessed material contained in the material processing device at the first point in time is when the level decreases and passes the upper limit.

The reference level can be determined by a rough sensor capable of detecting whether the level is above or below the upper limit and/or whether the processing device is (substantially) empty. The reference level may alternatively be determined manually.

By providing the processing device with a level sensor and a transmitter connected to the sensor it is possible to transmit the reference level (and possibly also an actual level) to all load-carrying vehicles involved (if provided with a receiver).

If the current level is above the upper limit it is known that the actual level used as reference level is at least at the upper limit. A more exact estimation of the reference level can be obtained by setting the reference level when the level passes the upper limit (while decreasing in some type of feeder during operation of the processing device). This level, i.e. the upper limit that is passed during operation, can also be used to provide and switch between wait- and go-signal to vehicles that have arrived at the processing device ready to dump unprocessed material (for instance red or green light to drivers of vehicles and other signals to autonomous vehicles).

In an embodiment the second point in time is a current point in time. This is not necessary but typically simplifies the calculations.

In an embodiment the material processing device is a material crusher. Other possibilities are, for instance, a mixing plant or a load pocket, which also can be considered to "process" the material.

In an embodiment at least the first load-carrying vehicle is provided with a receiver for receiving signals sent by wireless communication and a control unit arranged in communicational connection with the receiver, wherein the method comprises the steps of: receiving, by means of the receiver, a signal indicative of the total amount of unprocessed material that has been dumped into the material processing device during the first time period between the first point in time and the second point in time; receiving, by means of the receiver, a signal indicative of the total amount of unprocessed material that has been processed by the material processing device during the first time period, or obtaining information indicative of the total amount of unprocessed material that has been processed by the material processing device during the first time period, such as a standard or average processing rate of the material processing device, if such information is already available on-board the first load-carrying vehicle; receiving, by means of the receiver, a signal indicative of the reference level of unprocessed material contained in the material processing device at the first point in time; calculating, by means of the control unit, the current level of unprocessed material contained in the material processing device based on the information received or obtained; predicting, by means of the control unit and based on the current level of unprocessed material contained in the material processing device and on the expected future processing rate of the material processing device, at least one of the third point in time and the fourth point in time; establishing, by means of the control unit, the desired time-of-arrival period for arrival of the first load-carrying vehicle at the material processing device, wherein the desired time-of-arrival period extends between the start point and the end point and wherein at least one of the start point and end point is set so that the start point is, at the earliest, at the third point in time and/or so that the end point is, at the latest, at the fourth point in time; and setting or indicating, by means of the control unit, the speed of the first load-carrying vehicle so as to arrive at the material processing device within the desired time-of-arrival period.

This provides for a distributed system where the dumper or hauler or similar load-carrying vehicle receives the signals and information needed and makes the determinations and calculations etc. by itself. That is, no central control system is needed in this embodiment.

The system concerns a material processing device and at least one load-carrying vehicle configured to transport a load of unprocessed material to the material processing device and dump the unprocessed material directly or indirectly into the material processing device.

The system is characterized in that it is configured to:
determine a total amount of unprocessed material that has been dumped into the material processing device during a first time period between a first point in time and a second point in time;
determine a total amount of unprocessed material that has been processed by the material processing device during the first time period;
determine a reference level of unprocessed material contained in the material processing device at the first point in time;
determine a current level of unprocessed material contained in the material processing device based on i) the total amount of unprocessed material that has been dumped into the material processing device during the first time period, ii) the total amount of unprocessed material that has been processed by the material processing device during the first time period, and iii) the reference level of unprocessed material contained in the material processing device at the first point in time;
predict, based at least on the current level of unprocessed material contained in the material processing device and on an expected future processing rate of the material processing device, at least one of:
 a third point in time at which the level of unprocessed material is expected to fall below an upper limit, at which upper limit dumping of further unprocessed material into the material processing device is not allowed, so that dumping of unprocessed material becomes allowed, and
 a fourth point in time at which the level of unprocessed material is expected to fall below a lower limit indicating that the material processing device has or is about to run out of unprocessed material;
establish a desired time-of-arrival period for arrival of a first load-carrying vehicle at the material processing device, wherein the desired time-of-arrival period extends between a start point and an end point and wherein at least one of the start point and end point is set so that the start point is, at the earliest, at the third point in time and/or so that the end point is, at the latest, at the fourth point in time; and
adapt a speed of the first load-carrying vehicle so as to arrive at the material processing device within the desired time-of-arrival period.

In an embodiment at least the first load-carrying vehicle is provided with a receiver for receiving signals sent by wireless communication and a control unit arranged in communicational connection with the receiver, wherein the control unit is configured to calculate the current level of unprocessed material contained in the material processing device, predict the third and/or fourth point in time at which the level of unprocessed material in the material processing device is expected to fall below the lower or upper limit, and set or at least indicate the speed of the first load-carrying vehicle so as to arrive at the material processing device within the desired time-of-arrival period.

In an embodiment the system comprises at least a first and a second load-carrying vehicle, wherein each of said vehicles comprises a receiver and a control unit according to above, and wherein each of said vehicles also comprises a transmitter for transmitting by wireless means a signal indicative of at least an amount of a load of unprocessed material to be dumped or having been dumped into the material processing device.

Preferably, each vehicle is configured to also send and receive signals indicative of other useful vehicle information, such as geographical position, speed, target destination, etc.

In an embodiment the material processing device is provided with a level sensor configured to determine at least whether the level of unprocessed material is above or below an upper limit at which dumping of further unprocessed material into the material processing device is not allowed.

In an embodiment the material processing device is provided with a production sensor configured to determine an amount of material processed by the material processing device.

In an embodiment the material processing device is provided with a transmitter for, by wireless communication, transmitting a signal indicative of the level of unprocessed material and/or a signal indicative of the amount of material processed.

In an embodiment the material processing machine is a material crusher.

In an embodiment the load-carrying vehicle is a hauler or truck provided with a load-receiving container adapted to receive a load of material in the form of rock fragments, gravel, sand and the like.

The further aspects of the invention relate to:

A computer program product comprising program code means for performing the steps of the above method when said program is run on a computer.

A computer readable medium carrying a computer program comprising program code means for performing the steps of the above method when said program product is run on a computer.

A control unit for controlling the above system, the control unit being configured to perform the steps of the above method. Preferably, the control unit is arranged on the first load-carrying vehicle. Preferably, the control unit is configured to also control operation of the first load-carrying vehicle.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
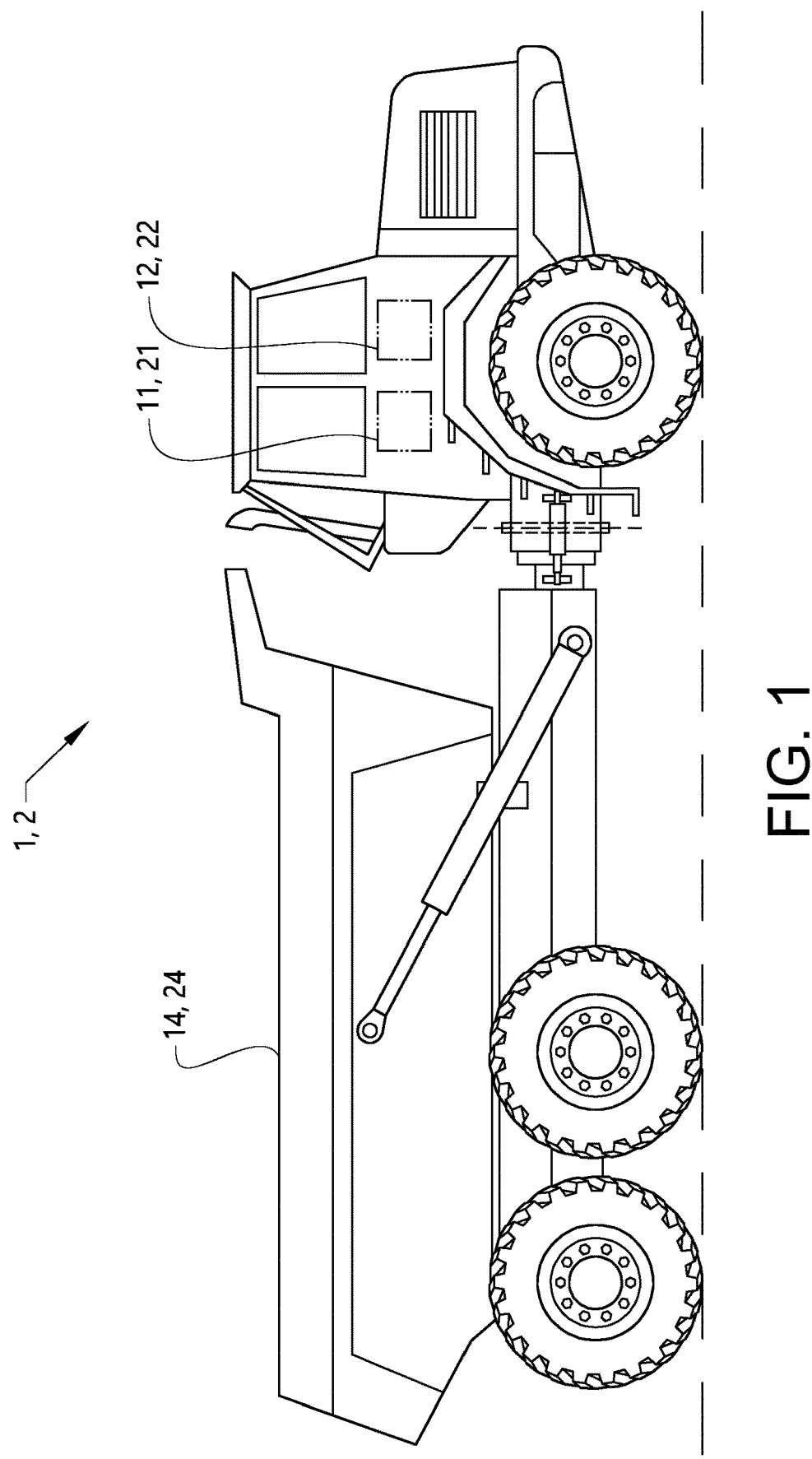
FIG. 1 shows an example of a load-carrying vehicle in the form of an articulated hauler.

FIG. 1 shows an example of a load-carrying vehicle 1, 2 in the form of an articulated hauler. The vehicle shown in FIG. 1 represents both vehicles 1, 2 shown in FIG. 2. As shown in FIG. 1 the hauler 1, 2 has a load-receiving container 14, 24 adapted to receive a load of material in the form of rock fragments, gravel, sand and the like. FIG. 1 further indicates that each hauler 1, 2 is provided with a receiver and transmitter 11, 21 and a control unit 12, 22. The receiver and transmitter 11, 21 are arranged to receive and send signals by wireless communication (e.g. direct radio, vehicle-to-vehicle communication, 5g). The control unit 12, 22 is arranged in communicational connection with the corresponding receiver and transmitter 11, 21. The control unit 12, 22 is, as will be further described below, configured to e.g. calculate a level of unprocessed material 5 contained in a material processing device 3 and a desired time-of-arrival period Td for the hauler 1, 2 at the material processing device 3, partly based on signals received by the corresponding transmitter 11, 21.

Examples of information that the vehicles 1, 2 can transmit by wireless means directly to each other are an amount of a load of unprocessed material 5 to be dumped or having been dumped into the crusher 3 (which may be the weight of the load currently carried or recently dumped), current speed, geographical position, estimated time of arrival at crusher 3, etc.

The control unit 11, 21 may include a microprocessor, microcontroller, programmable digital signal processor or another programmable device. The control unit may also, or instead, include an application specific integrated circuit, a programmable gate array or programmable array logic, a programmable logic device, or a digital signal processor.

Where the control unit includes a programmable device such as the microprocessor, microcontroller or programmable digital signal processor mentioned above, the processor may further include computer executable code that controls operation of the programmable device.

Figure 2:
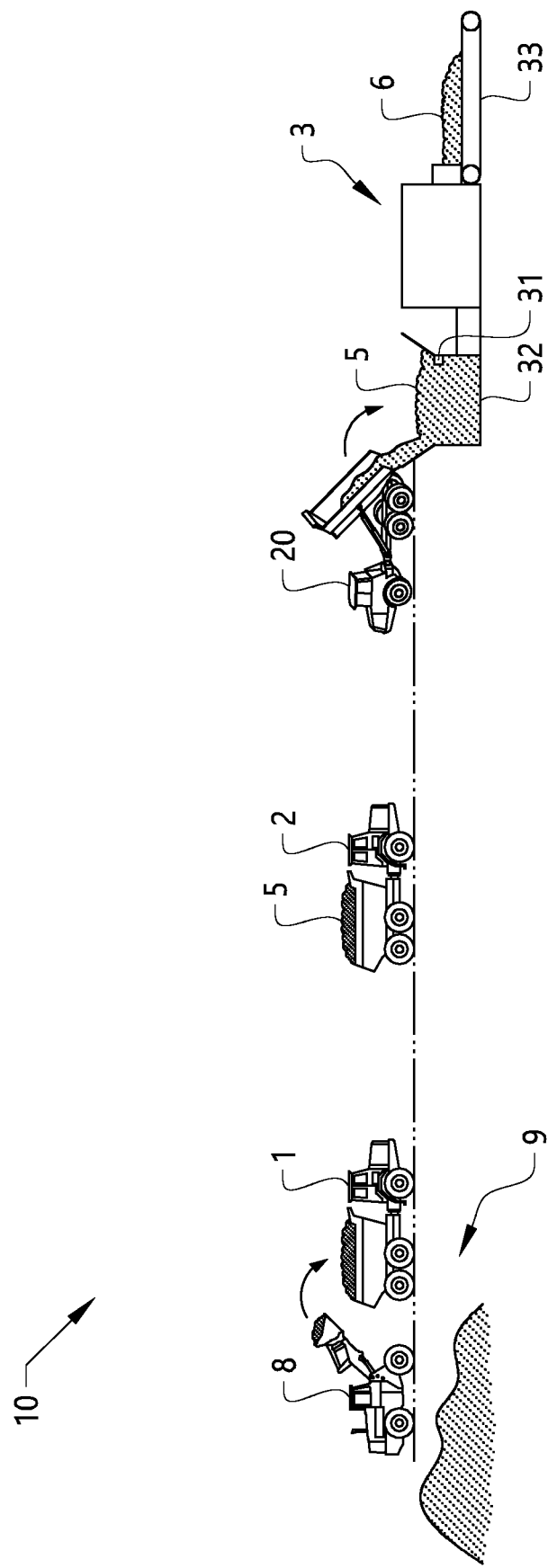
FIG. 2 shows a schematic view of an embodiment of a system according to the invention.

FIG. 2 shows a schematic view of an embodiment of a system 10 according to the invention. The exemplified system 10 comprises a material processing device 3 in the form of a crusher and a first and second load-carrying vehicle 1, 2 configured to transport a load of unprocessed material 5, which in this case is rock fragments, from a loading site 9 to the crusher 3 and dump the unprocessed material 5 into a feeder 32 of the crusher 3. The crusher 3 generates processed/crushed material 6 that is fed away by a conveyor belt 33 on an output side of the crusher (the right side of the crusher 3 in FIG. 2). A pre-set average crusher processing rate (in tonnes/h) has been established for the crusher 3.

The first and second load-carrying vehicles 1, 2 are in this case identical and illustrated in FIG. 1. The second vehicle 2 is ahead of the first vehicle 1 and will arrive at the crusher 3 and dump its load before the first vehicle 1. The vehicles 1, 2 may be of the conventional type with a human driver or they may be configured for autonomous operation.

FIG. 2 also shows a wheel loader 8 that loads vehicles at the loading site 9 and a further load-carrying vehicle 20 that has dumped its load of unprocessed material 5 into the feeder 32 of the crusher 3.

The crusher 3 is in this case provided with a "simple" level sensor 31 configured to determine only whether the level of unprocessed material 5 in the crusher feeder 32 is above or below an upper limit at which dumping of further unprocessed material 5 into the crusher 3 is not allowed. The crusher 3 is further provided with a production sensor in the form of a scale integrated in the conveyor belt 33 so as to determine (weigh) the amount of material that has been processed/crushed by the material processing device/crusher 3 (as a complement to the pre-set crusher processing rate). It may be noted that no material is lost or gained during the type of processing described here (except for some lost dust etc.) so a certain weight of processed material 6 corresponds to the same weight of unprocessed material 5.

The crusher is further provided with a transmitter (indicated as reference number 31, i.e. same as level sensor) for, by wireless communication, transmitting a signal indicative of the level of unprocessed material 5 and a signal indicative of the amount of material processed. These signals can be received by the first and second vehicle 1, 2. It should be noted that it is not necessary for the invention that the crusher 3 is provided with any sensors or transmitters 31, 33 as indicated in FIG. 2.

Figure 3:
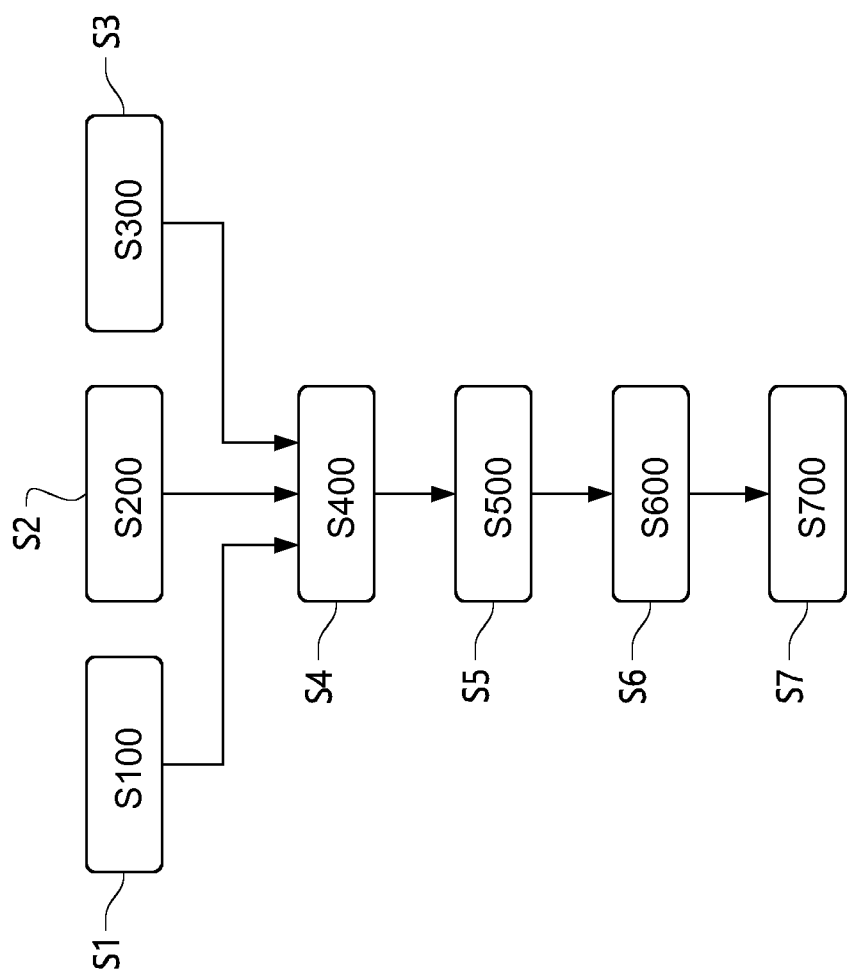
FIG. 3 shows a general flow chart for a method according to the invention.

As indicated in FIG. 3, the system 10 can be controlled by the following exemplifying general method steps (including some explanatory comments at the end of each step):

S1—determining a total amount of unprocessed material 5 that has been dumped into the crusher 3 during a first time period T1 between a first point in time t1 and a second point in time t2 (in this case a total weight of rock fragments, and where, typically, t2 is a current point in time and dumping during T1 has been carried out by other vehicles not shown in FIG. 2 that have transmitted the weight of their dumped loads);

S2—determining a total amount of unprocessed material 5 that has been processed by the crusher 3 during the first time period T1 (also a total weight of rock fragments, obtained from pre-set crusher processing rate times length of T1 and/or from data measured by scale of conveyor belt 33);

S3—determining a reference level of unprocessed material 5 contained in the material processing device 3 at the first point in time t1 (when level passes upper limit obtained from "simple" level sensor 31);

S4—determining a current level of unprocessed material 5 contained in the crusher 3 based on the information obtained in steps S1-S3 (difference compared to reference level depending on amounts of material dumped and processed during T1);

S5—predicting, based on the current level of unprocessed material 5 contained in the crusher 3 and on an expected future processing rate of the crusher 3, a fourth point in time t4 at which the level of unprocessed material 5 is expected to fall below a lower limit indicating that the crusher 3 has or is about to run out of unprocessed material 5 (based on the pre-set crusher processing rate and including the load to be dumped by the second vehicle 2 if relating prediction to the first vehicle 1);

S6—establishing a desired time-of-arrival period Td for arrival of the first load-carrying vehicle 1 at the crusher 3, wherein the desired time-of-arrival period Td extends between a start point and an end point and wherein the end point is set to be, at the latest, at the predicted fourth point in time t4 at which the level of unprocessed material 5 in the crusher 3 is expected to fall below the lower limit (i.e. calculation of the latest point of arrival for the first vehicle 1 at the crusher 3 to avoid that the crusher 3 gets empty); and S7—adapting a speed of the first load-carrying vehicle 1 so as to arrive at the crusher 3 within the desired time-of-arrival period Td (i.e. before the fourth point in time t4 where the crusher gets empty).

At least steps S1-S3 do not necessarily have to be carried out in the order indicated.

The method S1-S7 may be run more or less continuously for each load-carrying vehicle 1, 2 involved in the system 10. This means that the method can be carried out also for the second vehicle 2, which does not have any load-carrying vehicle ahead of itself that will dump a load before the second vehicle 2 (if considering that the further vehicle 20 has dumped its load already). Another way to say in principle the same thing is to say that the second vehicle 2 (and the further vehicle 10) is optional, in which case there is no vehicle ahead of the first load-carrying vehicle 1 that will dump any load before the first vehicle.

A main point with the above method is that a suitable point or period of arrival can be obtained without the use of a level sensor that provides input on a current level of material in the feeder 32; instead the current level is determined/calculated from the amount of material dumped into the crusher 3 and the amount of material processed by the crusher 3 between t1 and t2, together with a reference value for the level at t1. Such a reference level can be provided manually or by the "simple" level sensor 31 mentioned above.

Signals comprising information relating to steps S1-S3 can be received by the receiver 11 of the first vehicle 1 and the calculations and determinations etc. in steps S4-S6 can be carried out by the control unit 12. Also the speed adaptation of the first vehicle 1 in step S7 can be carried out by the control unit 12 (perhaps indirectly if the control unit 12 is not arranged to control operation of the first vehicle 1 but can send control commands to such an operational control unit). To adapt the speed can mean to e.g. display a recommended speed for a driver of the first vehicle 1 or to directly control the speed for an autonomous vehicle. The step of adapting the speed includes determining the position of the first vehicle 1 and the crusher 3 and determining the distance to go for the first vehicle 1, which is well known as such.

In step S1 the total amount of unprocessed material 5 dumped into the feeder 32 of the crusher 3 during the first time period T1 can be obtained by receiving transmitted information on the weights of all loads dumped into the material processing device 3 during the first time period T1 or, when the loads have substantially the same weight, by receiving information on a number of dumped loads during the first time period T1. For instance, the first and second vehicle 1, 2 can send to all other vehicles involved information on the weight of their load at what point in time it has dumped or plan to dump its load to the crusher 3 (and previous vehicles have already sent that information to the first and second vehicle 1, 2).

The following steps may be added to the steps S1-S7 above:

determining whether the current level of unprocessed material 5 in the crusher 3 is above an upper limit at which dumping of further unprocessed material 5 into the crusher 3 is not allowed;

predicting, based on the current level of unprocessed material 5 contained in the crusher 3 and on the expected future processing rate of the crusher 3, a third point in time t3 at which the level of unprocessed material 5 is expected to fall below an upper limit at which dumping of further unprocessed material 5 into the material processing device 3 is not allowed so that dumping of unprocessed material 5 becomes allowed; and setting a start point of the desired time-of-arrival period Td to be, at the earliest, at the predicted third point in time t3 at which the level of unprocessed material 5 in the crusher 3 is expected to fall below the upper limit.

The desired time-of-arrival period Td may thus be set to extend between t3 and t4 (or from somewhat after t3 to somewhat before t4).

If the current material level is not above the upper limit the start point of the desired time-of-arrival period Td may be set to the current point in time.

The steps of predicting the third and fourth points in time t3, t4 at which the level of unprocessed material 5 is expected to fall below the lower or upper limit may contain the steps of:

determining whether another load-carrying vehicle (the second load-carrying vehicle 2) will arrive at the crusher 3 before the first load-carrying vehicle 1, for instance based on a geographical positon of the second vehicle 2 sent from the second vehicle 2 to the first vehicle 1; and when so, predicting an amount of unprocessed material 5 to be dumped to the crusher 3 by the other (second) load-carrying vehicle and including that amount when predicting t3 and t4.

Step S7 may include the following steps:

providing information on a current geographical position of the first load-carrying vehicle 1 (obtained from global positioning means arranged on the first vehicle 1);

determining a distance between the first load-carrying vehicle 1 and the crusher 3 based on the current geographical position of the first load-carrying vehicle 1 and on information on available routes and a geographical position of the crusher 3 (which can be stored in a memory accessible for the control unit 12);

determining, based on the distance between the first load-carrying vehicle 1 and the crusher 3 and on the end point of the desired time-of-arrival period Td, a minimum average speed adapted so that the first load-carrying vehicle 1 will arrive at the crusher 3 at the end point of the desired time-of-arrival period Td if it moves with the minimum average speed; and/or determining, based on the distance between the first load-carrying vehicle 1 and the crusher 3 and on the start point of the desired time-of-arrival period Td, a maximum average speed adapted so that the first load-carrying vehicle 1 will arrive at the crusher 3 at the start point of the desired time-of-arrival period Td if it moves with the maximum average speed.

In an embodiment of the steps S1-S7 the method comprises the steps of (as indicated in FIG. 3):

S100—receiving, by means of the receiver 11, a plurality of signals indicative of the total amount of unprocessed material 5 that has been dumped into the crusher 3 during the first time period T1 between the first point in time t1 and the second point in time t2, wherein the signals comprises information on weights of dumped loads and are transmitted from other load-carrying vehicles;

S200—receiving, by means of the receiver 11, a signal indicative of the total amount of unprocessed material 5 that has been processed by the crusher 3 during the first time period T1 from the transmitter connected to the production sensor integrated in the conveyor belt 33 of the crusher 3, and, as a complement, obtaining information indicative of the total amount of unprocessed material 5 that has been processed by the crusher 3 during the first time period T1 in the form of the pre-set average processing rate of the crusher 3 accessible for the control unit 12 on-board the first load-carrying vehicle 1;

S300—receiving, by means of the receiver 11, a signal indicative of the reference level of unprocessed material 5 contained in the crusher 3 at the first point in time t1 from the transmitter connected to the level sensor 31 of the crusher 3;

S400—calculating, by means of the control unit 12, the current level of unprocessed material 5 contained in the crusher 3 based on the information received and/or obtained;

S500—predicting, by means of the control unit 12 and based on the current level of unprocessed material 5 contained in the crusher 3 and on the expected future processing rate of the crusher 3, the fourth point in time t4 at which the level of unprocessed material 5 is expected to fall below the lower limit indicating that the crusher 3 has or is about to run out of unprocessed material 5 (also, or instead, the third point in time t3 may be predicted as explained previously);

S600—establishing, by means of the control unit 12, the desired time-of-arrival period Td for arrival of the first load-carrying vehicle 1 at the crusher 3, wherein the desired time-of-arrival period Td extends between the start point and the end point and wherein the end point is set to be, at the latest, at the predicted fourth point in time t4 at which the level of unprocessed material 5 in the crusher 3 is expected to fall below the lower limit (also, or instead, the third point in time t3 can be used to set the start point); and S700—setting or indicating, by means of the control unit 12, the speed of the first load-carrying vehicle 1 so as to arrive at the crusher 3 within the desired time-of-arrival period Td.

It is to be understood that the present invention is not limited to the embodiments described above and illustrated in the drawings; rather, the skilled person will recognize that many changes and modifications may be made within the scope of the appended claims.

The invention claimed is:

1. Method for controlling a system comprising a material processing device and at least one load-carrying vehicle configured to transport a load of unprocessed material to the material processing device and dump the unprocessed material directly or indirectly into the material processing device, the method comprising:

determining a total amount of unprocessed material that has been dumped into the material processing device during a first time period between a first point in time and a second point in time;

determining a total amount of unprocessed material that has been processed by the material processing device during the first time period;

determining a reference level of unprocessed material contained in the material processing device at the first point in time;

determining a current level of unprocessed material contained in the material processing device based on i) the total amount of unprocessed material that has been dumped into the material processing device during the first time period, ii) the total amount of unprocessed material that has been processed by the material processing device during the first time period, and iii) the reference level of unprocessed material contained in the material processing device at the first point in time;

predicting, based at least on the current level of unprocessed material contained in the material processing device and on an expected future processing rate of the material processing device, at least one of:

a third point in time at which the level of unprocessed material is expected to fall below an upper limit at which upper limit dumping of further unprocessed material into the material processing device is not allowed so that dumping of unprocessed material becomes allowed, and a fourth point in time at which the level of unprocessed material is expected to fall below a lower limit indicating that the material processing device has or is about to run out of unprocessed material;

establishing a desired time-of-arrival period for arrival of a first load-carrying vehicle at the material processing device, wherein the desired time-of-arrival period extends between a start point and an end point and wherein at least one of the start point and end point is set so that the start point is, at the earliest, at the third point in time and/or so that the end point is, at the latest, at the fourth point in time; and adapting a speed of the first load-carrying vehicle so as to arrive at the material processing device within the desired time-of-arrival period.

2. Method according to claim 1, wherein the method comprises:

determining whether the current level of unprocessed material in the material processing device is above the upper limit at which dumping of further unprocessed material into the material processing device is not allowed.

3. Method according to claim 1, wherein the method comprises:

determining whether at least a second load-carrying vehicle will arrive at the material processing device before the first load-carrying vehicle; and when so, predicting an amount of unprocessed material to be dumped to the material processing device by the second load-carrying vehicle;

wherein predicting the third and/or fourth point in time at which the level of unprocessed material is expected to fall below the lower or upper limit is based also on the predicted amount of unprocessed material to be dumped by the second load-carrying vehicle.

4. Method according to claim 1, wherein the method comprises:

providing information on a current geographical position of the first load-carrying vehicle;

determining a distance between the first load-carrying vehicle and the material processing device based on the current geographical position of the first load-carrying vehicle and on information on available routes and a geographical position of the material processing device;

determining, based on the distance between the first load-carrying vehicle and the material processing device and on the end point of the desired time-of-arrival period, a minimum average speed adapted so that the first load-carrying vehicle will arrive at the material processing device at the end point of the desired time-of-arrival period if it moves with the minimum average speed; and/or determining, based on the distance between the first load-carrying vehicle and the material processing device and on the start point of the desired time-of-arrival period, a maximum average speed adapted so that the first load-carrying vehicle will arrive at the material processing device at the start point of the desired time-of-arrival period if it moves with the maximum average speed.

5. Method according to claim 1, wherein the start point of the desired time-of-arrival period is set to be somewhere between a current point in time and a future point in time that is before the end point of the desired time-of-arrival period.

6. Method according to claim 1, wherein the total amount of unprocessed material dumped into the material processing device during the first time period is at least partly obtained by receiving information on weights of all loads dumped into the material processing device during the first time period or, when the loads have substantially the same weight, by receiving information on a number of dumped loads during the first time period.

7. Method according to claim 1, wherein the total amount of unprocessed material processed by the material processing device during the first time period is obtained from information of a standard or average processing rate of the material processing device and/or by receiving information from a weighing measurement of a total amount of processed material.

8. Method according to claim 1, wherein the reference level of unprocessed material contained in the material processing device at the first point in time is a lower limit indicating that the material processing device has or is about to run out of unprocessed material.

9. Method according to claim 1, wherein the reference level of unprocessed material contained in the material processing device at the first point in time is at or above an upper limit at which dumping of further unprocessed material into the material processing device is not allowed.

10. Method according to claim 9, wherein the reference level of unprocessed material contained in the material processing device at the first point in time is when the level decreases and passes the upper limit.

11. Method according to claim 1, wherein the second point in time is a current point in time.

12. Method according to claim 1, wherein the material processing device is a material crusher.

13. Method according to claim 1, wherein at least the first load-carrying vehicle is provided with a receiver for receiving signals sent by wireless communication and a control unit arranged in communicational connection with the receiver, wherein the method comprises:

receiving, by means of the receiver, at least one signal indicative of the total amount of unprocessed material that has been dumped into the material processing device during the first time period between the first point in time and the second point in time;

receiving, by means of the receiver, at least one signal indicative of the total amount of unprocessed material that has been processed by the material processing device during the first time period, and/or obtaining information indicative of the total amount of unprocessed material that has been processed by the material processing device during the first time period, such as a standard or average processing rate of the material processing device, if such information is already available on-board the first load-carrying vehicle;

receiving, by means of the receiver, at least one signal indicative of the reference level of unprocessed material contained in the material processing device at the first point in time;

calculating, by means of the control unit, the current level of unprocessed material contained in the material processing device based on the information received or obtained;

predicting, by means of the control unit and based at least on the current level of unprocessed material contained in the material processing device and on the expected future processing rate of the material processing device, at least one of the third point in time and the fourth point in time;

establishing, by means of the control unit, the desired time-of-arrival period for arrival of the first load-carrying vehicle at the material processing device, wherein the desired time-of-arrival period extends between the start point and the end point and wherein at least one of the start point and end point is set so that the start point is, at the earliest, at the third point in time and/or so that the end point is, at the latest, at the fourth point in time; and setting or indicating, by means of the control unit, the speed of the first load-carrying vehicle so as to arrive at the material processing device within the desired time-of-arrival period.

14. System comprising a material processing device and at least one load-carrying vehicle configured to transport a load of unprocessed material to the material processing device and dump the unprocessed material directly or indirectly into the material processing device, the system configured to:

determine a total amount of unprocessed material that has been dumped into the material processing device during a first time period between a first point in time and a second point in time;

determine a total amount of unprocessed material that has been processed by the material processing device during the first time period;

determine a reference level of unprocessed material contained in the material processing device at the first point in time;

determine a current level of unprocessed material contained in the material processing device based on i) the total amount of unprocessed material that has been dumped into the material processing device during the first time period the total amount of unprocessed material that has been processed by the material processing device during the first time period, and iii) the reference level of unprocessed material contained in the material processing device at the first point in time;

predict, based at least on the current level of unprocessed material contained in the material processing device and on an expected future processing rate of the material processing device, at least one of:

a third point in time at which the level of unprocessed material is expected to fall below an upper limit, at which upper limit dumping of further unprocessed material into the material processing device is not allowed, so that dumping of unprocessed material becomes allowed, and a fourth point in time at which the level of unprocessed material is expected to fall below a lower limit indicating that the material processing device has or is about to run out of unprocessed material;

establish a desired time-of-arrival period for arrival of a first load-carrying vehicle at the material processing device, wherein the desired time-of-arrival period extends between a start point and an end point and wherein at least one of the start point and end point is set so that the start point is, at the earliest, at the third point in time and/or so that the end point is, at the latest, at the fourth point in time; and adapt a speed of the first load-carrying vehicle so as to arrive at the material processing device within the desired time-of-arrival period.

15. System according to claim 14, wherein at least the first load-carrying vehicle is provided with a receiver for receiving signals sent by wireless communication and a control unit arranged in communicational connection with the receiver, wherein the control unit is configured to calculate the current level of unprocessed material contained in the material processing device, predict the third and/or fourth point in time at which the level of unprocessed material in the material processing device is expected to fall below the lower or upper limit, and set or at least indicate the speed of the first load-carrying vehicle so as to arrive at the material processing device within the desired time-of-arrival period.

16. System according to claim 15, wherein the system comprises at least a first and a second load-carrying vehicle, wherein each of said vehicles comprises a receiver and the control unit, and wherein each of said vehicles also comprises a transmitter for transmitting by wireless means a signal indicative of at least an amount of a load of unprocessed material to be dumped or having been dumped into the material processing device.

17. System according to claim 14, wherein the material processing device is provided with a level sensor configured to determine at least whether the level of unprocessed material is above or below an upper limit at which dumping of further unprocessed material into the material processing device is not allowed.

18. System according to claim 14, wherein the material processing device is provided with a production sensor configured to determine an amount of material processed by the material processing device.

19. System according to claim 17, wherein the material processing device is provided with a transmitter for, by wireless communication, transmitting a signal indicative of the level of unprocessed material and/or a signal indicative of the amount of material processed.

20. System according to claim 14, wherein the material processing machine is a material crusher.

21. A non-transitory computer readable medium carrying a computer program comprising program code means for performing the method of claim 1 when said program is run on a computer.

22. A control unit for controlling a system configured to perform the steps of the method according to claim 1.

23. A control unit according to claim 22, wherein the control unit is arranged on the load-carrying vehicle.

24. A control unit according to claim 22, wherein the control unit is further configured to control operation of the load-carrying vehicle.

* * * * *